(No Model.)

D. C. BULLARD.
PLANTER AND MANURE DISTRIBUTER.

No. 345,210. Patented July 6, 1886.

WITNESSES:
W. W. Hollingsworth
W. X. Stevens.

INVENTOR:
D. C. Bullard
BY Munn & Co.
ATTORNEYS.

UNITED STATES PATENT OFFICE.

DAVID C. BULLARD, OF ELBERTON, GEORGIA.

PLANTER AND MANURE-DISTRIBUTER.

SPECIFICATION forming part of Letters Patent No. 345,210, dated July 6, 1886.

Application filed September 21, 1885. Serial No. 177,769. (No model.)

*To all whom it may concern:*

Be it known that I, DAVID C. BULLARD, a citizen of the United States, residing at Elberton, in the county of Elbert and State of Georgia, have invented a new and useful Improvement in a Planter and Manure-Distributer, of which the following is a description.

This invention relates to that class of devices which are designed to be drawn over the field by teams to sow various seeds—such as corn and cotton—and to distribute fertilizers—such as guano; and the object of this invention is to adapt a single machine to do either of the services named one at a time, or to plant seed and drop fertilizer beside it at the same time.

To this end my invention consists in the construction and combination of parts hereinafter described and claimed, reference being had to the accompanying drawings, in which—

Figure 1:
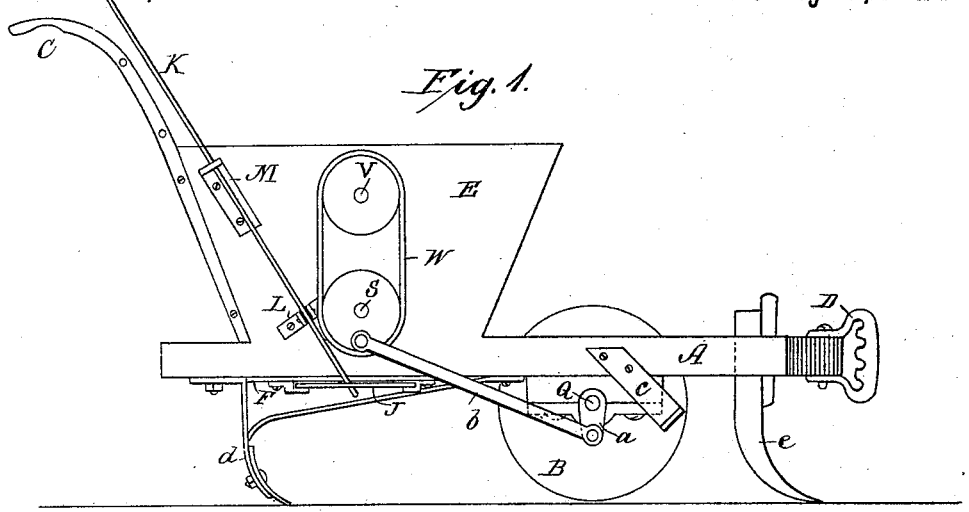
Figure 2:
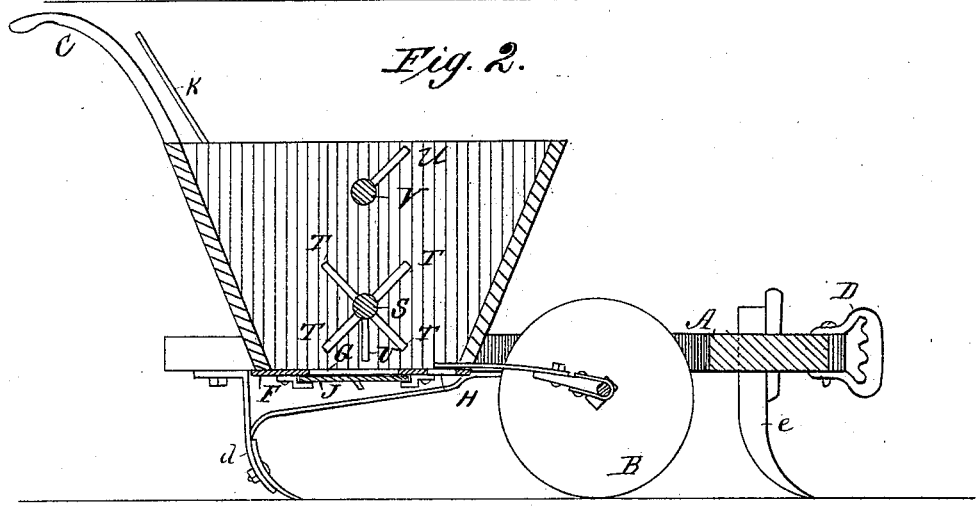
Figure 3:
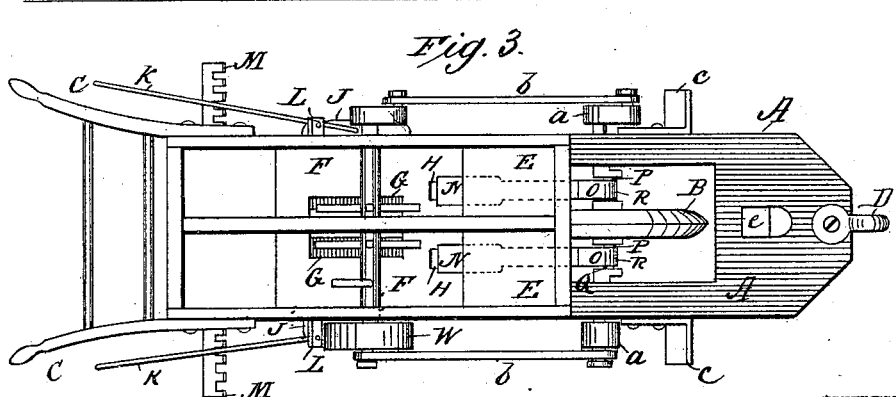

Figure 1 is a side elevation of my planter. Fig. 2 is a longitudinal vertical section of the same, and Fig. 3 is a plan view thereof.

A represents a frame mounted on a single wheel, B, and provided with common plow-handles, C, by which it may be guided, and having a clevis, D, whereby it may be attached to a team, to be drawn.

E is a twin-chambered hopper secured upon the frame A and provided with a sheet-metal bottom, F, which has two apertures, G H, in each chamber. The apertures G are long and narrow, adapted to discharge guano or any fertilizer in drills, and they are provided with gates J, which slide beneath the apertures transversely to them. These gates are provided with levers K, pivoted on brackets L to the hopper.

M represents toothed racks fixed to the hopper to receive and hold the levers K at whatever degree of opening the gates J may be set. These levers stand in such proximity to the handles C that the operator may at any time open or close either gate more or less, or he may drop the fertilizer by periodical movements of either of the said levers.

N represents gates arranged to operate automatically to open and shut the apertures H. These gates are provided with shanks O, connected with cranks P of the axle Q, on which the wheel B is fixed. The shanks O are elastic, to accommodate the vertical motion of the cranks; but they are sufficiently rigid to transmit the horizontal motion to the gates. Each of the said shanks is slotted, and connected with a pitman-head, R, by a set-screw, whereby the gates may be set to open the apertures at each revolution of the axle, (more or less,) to regulate the amount of material discharged. Corn requires a very small opening, cotton-seed a larger one, and fertilizer the largest opening of the gates. The pitman-heads R are mere bearings for the shanks O, to attach them to the cranks.

S is a shaft journaled in the hopper and provided with four square arms, T, in each chamber, and with a single arm, U, in one chamber, to produce an irregular stirring in cotton-seed or in fertilizer, the angular arms tending to grind the latter.

V is another shaft journaled in the hopper, provided with one arm in each chamber.

The shafts S and V are provided with pulleys connected by a belt, W, which causes the arms of one shaft to meet those of the other, thereby further tending to break up any lumps of seed or fertilizer. The shaft S is connected with the axle Q by cranks $a$ and connecting-rods $b$, the crank on one end of the axle standing about one-third of a circle from the crank on the other end, and the cranks on the shaft S corresponding thereto, in order that rotary motion may be positively communicated from the axle to the said shaft.

$c$ $c$ represent guards for the cranks, which guards consist of brackets fixed to the frame, and extending in front of the cranks to break clods and lumps of earth or to move any stones that might endanger breaking the cranks.

$d$ $d$ are plow-carriers, consisting of metallic hooks secured forward and rearward to the frame of the machine by screw-bolts, and provided with bolt-holes at their lower ends, whereby shovel-plows or any other style of plows may be secured.

$e$ is a central plow, in the furrow of which the wheel B travels.

Either gate N may be set to keep its aperture closed, even while it continues to reciprocate with the crank. By this means one chamber may be worked alone with any material in it to be distributed, or one may distribute one material and the other another. In this way corn and fertilizer may be dropped side by side.

What I claim as my invention, and desire to secure by Letters Patent, is—

1. The combination, with the hopper having an aperture in its bottom, of the transversely-sliding gate J, fitted to close or partially close said aperture, the lever K, pivoted to the side of the hopper and connected to the gate J at its lower end, the lever extending upward and rearward toward the operator's place, and the rack M, projecting from the side of the hopper and adapted to hold the lever K in any desired position, whereby the size of the opening in the hopper-bottom may be easily regulated or the said opening closed, substantially as set forth.

2. The combination of the frame A, the wheel B, journaled therein on a cranked axle, Q, the twin-chambered hopper E, secured on the frame, and having apertures G and H in the bottom of each chamber, the gates J, fitted to slide beneath the apertures G, the gates N, fitted to open and close the apertures H, and the spring-shanks O, connecting the gates N with the cranks on the said axle, substantially as shown and described.

3. The combination of the frame A, mounted on the wheel B, and the axle Q, provided with cranks $a$, the twin-chambered hopper E, secured to the frame, the shafts S and V in vertical alignment, having stirrer-arms and provided with pulleys connected by a belt, the shaft S, provided with cranks, and rods $b$, connecting the said cranks with the cranks $a$, substantially as shown and described.

4. The combination of the frame A, the wheel B, and axle Q, journaled therein and provided with cranks $a$, and the guards $c$, secured to the frame in front of the said cranks, substantially as shown and described.

5. The combined planter and fertilizer-distributer consisting of the frame A, the axle Q, having cranks P and $a$, wheel B, the hopper E in rear of the wheel and provided with front and rear openings, G H, the shaft S and its operating-fingers over the opening G, the shaft V and its finger over the shaft S, the shafts S V being operated from the cranks $a$ by suitable connections, the longitudinal gate N, adapted to open and close the opening H, and operated from the crank P, the transverse gate J, adapted to open and close the opening G, the upward and rearward extending levers K, connected to said gate J, and means for locking said levers, substantially as set forth.

DAVID C. BULLARD.

Witnesses:
WILLIAM M. JONES,
GEO. L. ALMOND.